US012576910B2

(12) United States Patent
Miller et al.

(10) Patent No.: US 12,576,910 B2
(45) Date of Patent: Mar. 17, 2026

(54) VEHICLE OPERATION WITH STEERING WHEEL HANDS-ON/OFF DETECTION

(71) Applicant: Ford Global Technologies, LLC, Dearborn, MI (US)

(72) Inventors: Justin Miller, Berkley, MI (US); Alexandra Taylor, Harbor Springs, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 18/534,952

(22) Filed: Dec. 11, 2023

(65) Prior Publication Data

US 2025/0187659 A1     Jun. 12, 2025

(51) Int. Cl.
| | |
|---|---|
| *B62D 6/10* | (2006.01) |
| *B60T 7/12* | (2006.01) |
| *B62D 5/04* | (2006.01) |
| *B62D 15/02* | (2006.01) |

(52) U.S. Cl.
CPC .................. *B62D 6/10* (2013.01); *B60T 7/12* (2013.01); *B62D 5/0466* (2013.01); *B62D 15/025* (2013.01); *B62D 15/029* (2013.01); *B60T 2260/02* (2013.01)

(58) Field of Classification Search
CPC ...... B62D 6/10; B62D 5/0466; B62D 15/025; B62D 15/029; B60T 7/12; B60T 2260/02
See application file for complete search history.

(56) References Cited

U.S. PATENT DOCUMENTS

| | | | |
|---|---|---|---|
| 9,096,262 B2 | 8/2015 | Urhahne | |
| 9,604,649 B1 | 3/2017 | Pastor et al. | |
| 11,052,940 B1 * | 7/2021 | Narasimhan | ........... B62D 6/008 |
| 2018/0251066 A1 | 9/2018 | Murata et al. | |
| 2020/0290674 A1 | 9/2020 | Oesterwind | |
| 2021/0009108 A1 * | 1/2021 | Tsukano | ................ B60W 30/02 |
| 2022/0289281 A1 * | 9/2022 | Narasimhan | ........... B62D 5/001 |
| 2022/0379883 A1 * | 12/2022 | Bruno | ............... B60W 30/0956 |

FOREIGN PATENT DOCUMENTS

| | | | |
|---|---|---|---|
| CN | 111693081 A | 9/2020 | |
| CN | 115107785 A | 9/2022 | |
| WO | WO-2018230101 A1 * | 12/2018 | ............. B60R 21/00 |

OTHER PUBLICATIONS

Schinkel, W. et al., "Driver Intervention Detection via Real-Time Transfer Function Estimation," IEEE Transactions on Intelligent Transportation Systems, vol. 22, No. 2, Feb. 2021, 10 pages.

* cited by examiner

*Primary Examiner* — Joseph J Dallo
(74) *Attorney, Agent, or Firm* — Frank Lollo; Brooks Kushman P.C.

(57) ABSTRACT

A system including a computer having a processor and a memory. The memory includes instructions executable by the processor to, upon actuating movement of a steering element of a vehicle, measure a torque applied to the steering element in a direction opposite the actuated movement. In response to a determination that the torque is less than a predetermined threshold, the processor actuates a component of the vehicle.

18 Claims, 3 Drawing Sheets

VEHICLE OPERATION WITH STEERING WHEEL HANDS-ON/OFF DETECTION

BACKGROUND

A torque sensor can be used in a vehicle steering system to assist in determining an amount of torque applied to a steering wheel, e.g., by an operator's hand and/or due to some other source.

DETAILED DESCRIPTION

Figure 1:
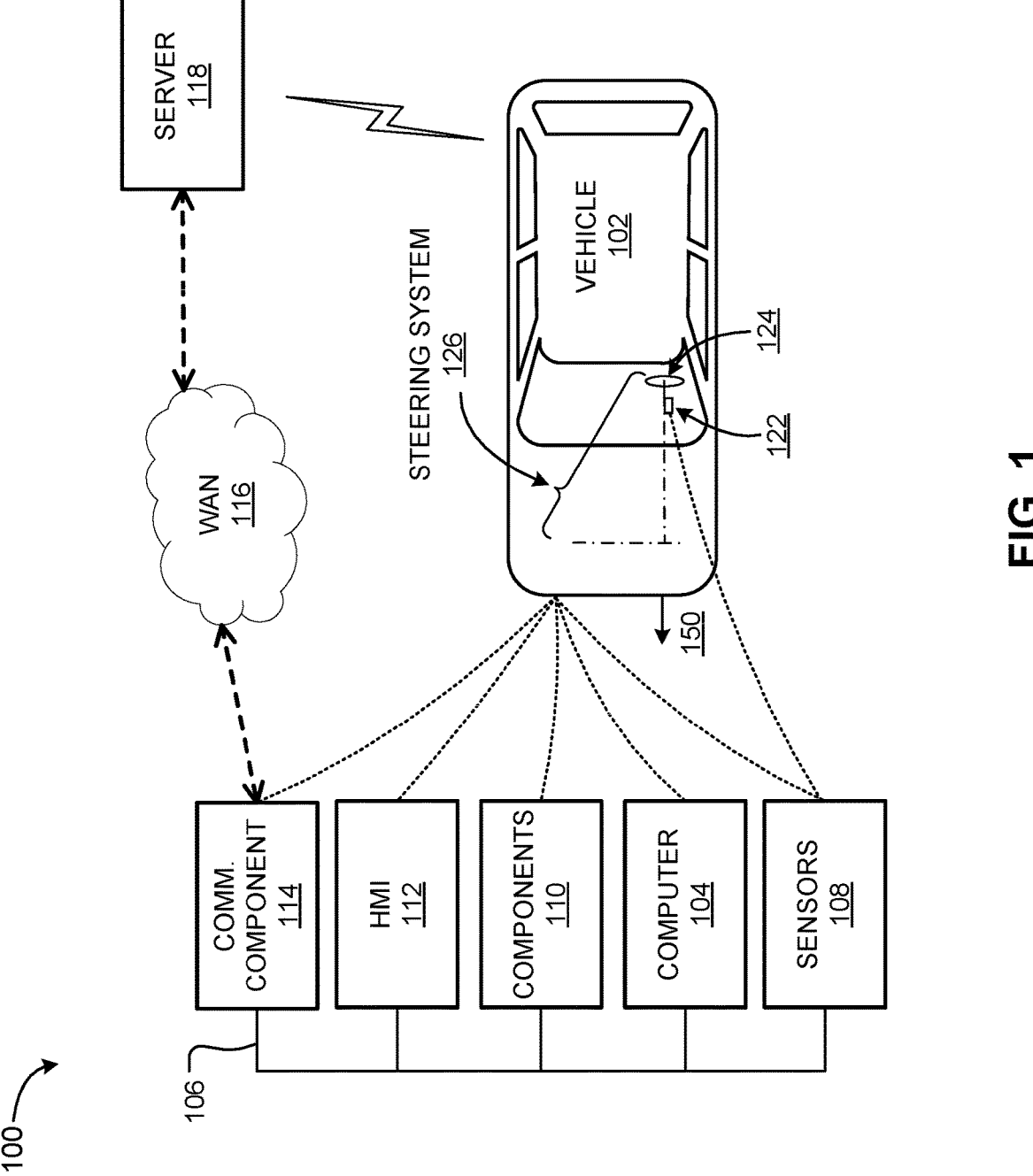
FIG. 1 is a block diagram of an example system for a vehicle.

This disclosure provides techniques for controlling vehicle components, features, and/or systems in response to determining whether an operator's hands are in contact with a vehicle steering wheel. In an example, the vehicle steering system actuates movement of the steering wheel and measures a torque applied to the steering wheel in a direction opposite an actuated movement. In an example, the steering wheel is moved back and forth (e.g., according to a sine-wave) where the movement is sufficiently small so as to not affect the direction of the vehicle. When at least one of the actuated back and forth movements is resisted by an operator's hand being in contact with the steering wheel, the resulting torque measurement is higher than a measurement resulting from steering column friction or a measurement resulting from an operator's hand lightly resting on the steering wheel, for example. This higher torque measurement allows for a higher threshold beyond which the system can make a better determination than is typically otherwise possible an operator has their hands on the steering wheel. The threshold torque can be a predetermined threshold that is set to be typically above a torque measurement resulting from e.g., steering column friction. This higher threshold, therefore, can provide a reliable determination of whether an operator's hands are in contact with a vehicle steering wheel.

In response to a determination that the measured torque is less than the predetermined threshold, the system can actuate components and/or systems of the vehicle. In an example, in response to determining that an operator's hands have been removed from contact with the steering wheel, the system can generate output to notify the operator to place one or more hands in contact with the steering wheel. In another example, in response to a determination that an operator's hands are presently in contact with the steering wheel, the system can actuate and/or maintain a current assisted driving mode.

Disclosed herein is a system including a computer having a processor and a memory. The memory includes instructions executable by the processor to, upon actuating movement of a steering element of a vehicle, measure a torque applied to the steering element in a direction opposite the actuated movement. The instructions can include instructions to in response to a determination that the torque is less than a predetermined threshold, actuate a component of the vehicle.

The instructions to actuate movement of the steering element can include instructions to rotate the steering element in a first rotational direction and subsequently rotate the steering element in a second rotational direction opposite the first.

The instructions can include further instructions to determine that the vehicle is turning and in response to a determination that the vehicle is turning, rotate the steering element in a direction opposite a direction the vehicle is turning.

The predetermined threshold can be determined empirically.

The instructions to actuate movement of the steering element can include instructions to rotate the steering element to a specified angular offset from a center position.

The instructions to actuate a component of the vehicle can include instructions to provide output to indicate returning the steering element to the center position.

The system can further comprise a first actuator to actuate movement of the steering element and a second actuator to control a direction of the vehicle.

The instructions to actuate movement of the steering element can include instructions to randomly activate the first actuator to rotate the steering element independently of the second actuator.

The instructions to actuate the component of the vehicle can include instructions to actuate a vehicle brake.

The instructions to actuate the component of the vehicle can include instructions to provide audio and/or visual output.

Disclosed herein is a method including, upon actuating movement of a steering element of a vehicle, measuring a torque applied to the steering element in a direction opposite the actuated movement. The method can include, in response to a determination that the torque is less than a predetermined threshold, actuating a component of the vehicle.

Actuating movement of the steering element can include rotating the steering element in a first rotational direction and subsequently rotating the steering element in a second rotational direction opposite the first.

The method can further comprise determining that the vehicle is turning and in response to determining that the vehicle is turning, rotating the steering element in a direction opposite a direction the vehicle is turning.

Actuating movement of the steering element can include rotating the steering element to a specified angular offset from a center position.

The specified angular offset can be approximately 45 degrees.

Actuating a component of the vehicle can include providing audio and/or visual output to indicate returning the steering element to the center position.

The method can further comprise activating a first actuator to actuate movement of the steering element and activating a second actuator to control a direction of the vehicle.

Actuating movement of the steering element can include randomly rotating the steering element.

The predetermined threshold can be determined empirically.

Actuating a component of the vehicle can include providing audio and/or visual output.

FIG. 1 is a block diagram of an example vehicle. As shown in FIG. 1, system 100 includes vehicle 102, that includes computer 104, which is communicatively coupled, via vehicle network 106, to various elements including sensors 108, subsystems or components 110, such as steering, propulsion, braking, human machine interface (HMI) 112, and communication component 114. Computer 104, and server 118 discussed below, include a processor and a memory. A memory of computer 104, such as those described herein, includes one or more forms of non-transitory media readable by computer 104, and can store instructions executable by computer 104 for performing various operations, such that the vehicle computer is configured to perform the various operations, including those disclosed herein.

For example, computer 104 can include a generic computer with a processor and memory as described above and/or may comprise an electronic control unit (ECU) or a controller for a specific function or set of functions, and/or a dedicated electronic circuit including an ASIC (application specific integrated circuit) that is manufactured for a particular operation, (e.g., an ASIC for processing data from sensors and/or communicating data from sensors 108). In another example, computer 104 may include an FPGA (Field-Programmable Gate Array), which is an integrated circuit manufactured to be configurable by a user. In example embodiments, a hardware description language such as VHDL (Very High Speed Integrated Circuit Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected or coupled to the FPGA circuit. In some examples, a combination of processor(s), ASIC(s), and/or FPGA circuits may be included in computer 104. Further, computer 104 may include a plurality of computers in the vehicle (e.g., a plurality of ECUs or the like) operating together to perform operations ascribed herein to the computer 104.

A memory of computer 104 can include any type, such as hard disk drives, solid state drives, or any other volatile or non-volatile media. The memory can store the collected data transmitted by sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, for example, as a memory internal to computer 104.

Computer 104 can include or access instructions to operate one or more components 110 such as vehicle brakes, propulsion (e.g., one or more of an internal combustion engine, electric motor, hybrid engine, etc.), steering, climate control, interior and/or exterior lights, infotainment, navigation etc., as well as to determine whether and when computer 104, as opposed to a human operator, is to control such operations. Computer 104 can include or be communicatively coupled, e.g., via vehicle network 106, to more than one processor, which can be included in components 110 such as sensors 108, electronic control units (ECUs) or the like included in the vehicle for monitoring and/or controlling various vehicle components, e.g., a powertrain controller, a brake controller, a steering controller, etc.

Vehicle sensors 108 can further include torque sensor 122, which can be any suitable torque sensor that operates to measure torque (i.e., a torsion moment) applied to a steering element, e.g., steering wheel 124, as an operator applies a rotational force to the steering wheel to control the heading of vehicle 102. In an example, torque sensor 122 is mounted to steering system 126 to measure torque in the range of 0.02 Newton meters (N-m) to 2.0 N-m. Torque sensor 122 can include a calibrated strain gauge, for example, to provide a voltage signal that is proportional to torque applied to steering wheel 124. In an example, torque sensor 122 is capable of measuring torque at all times, or at virtually all times, that an operator steers vehicle 102 with at least one hand in contact with steering wheel 124 as vehicle 102 proceeds along path 150. In response to an operator removing their hands from steering wheel 124, torque sensor 122 may measure zero torque or only a small amount of torque resulting from friction in steering system 126, for example. In an example implementation, torque sensor 122 can measure an overall or total torque to which a steering wheel 124 is subjected, which can include torque applied by an operator of vehicle 102. Overall torque measured by torque sensor 122 can include parasitic or frictional torque contributions, such as those applied by static and dynamic components of steering system 126.

Figure 2:
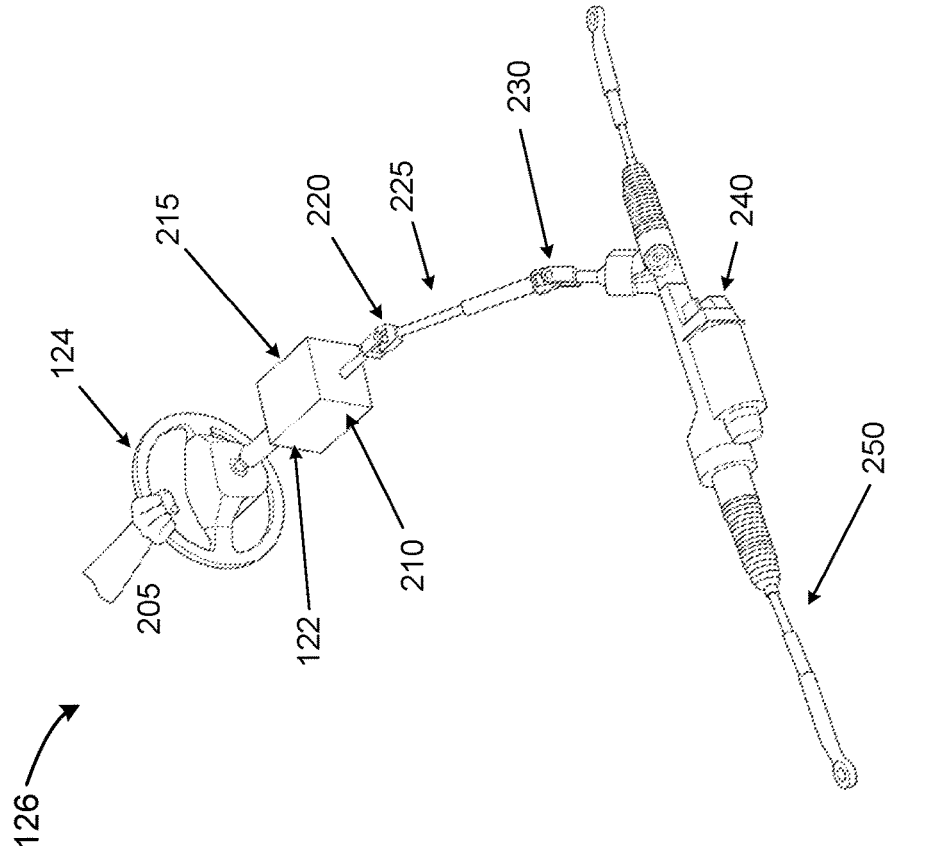
FIG. 2 is a diagram showing steering components of a vehicle.

As used herein, a steering system, which is described in greater detail in reference to FIG. 2, refers to a set of mechanical and/or electromechanical components used to steer vehicle 102. Accordingly, for example, steering system 126 can include steering wheel 124, as well as a steering column connected to steering wheel 124. Steering system 126 can also include an electronic power assistance steering (EPAS) motor that operates to amplify and/or augment torque transmitted from steering wheel 124 to a pinion gear positioned on a steering rack of vehicle 102. Steering system 126 can further include bushings, seals, fluid couplings, steering rods, steering dampers, etc., which assist in controlling the heading of vehicle 102 as the vehicle moves along path 150. It is noted that although FIGS. 1 and 2 show a steering wheel, techniques described herein can apply to steering elements other than a steering wheel of a vehicle, such as a joystick, an aircraft control yoke, etc.

Computer 104 may be generally arranged for communications on vehicle network 106 that can include a communications bus in the vehicle, such as a controller area network CAN or the like, and/or other wired and/or wireless mechanisms. Vehicle network 106 corresponds to a communications network, which can facilitate exchange of messages between various onboard vehicle devices, e.g., sensors 108, components 110, computer 104. Computer 104 can be generally programmed to send and/or receive, via vehicle network 106, messages to and/or from other devices of vehicle 102, e.g., any or all of ECUs, sensors 108, actuators, components 110, communications component 114, HMI 112. For example, various component 110 subsystems (e.g., components 110) can be controlled by respective ECUs.

Further, in implementations in which computer 104 actually comprises a plurality of devices, vehicle network 106 may be used for communications between devices represented as computer 104 in this disclosure. For example, vehicle network 106 can provide a communications capability via a wired bus, such as a CAN bus, a LIN bus, or can utilize any type of wireless communications capability. Vehicle network 106 can include a network in which messages are conveyed using any other wired communication technologies and/or wireless communication technologies, e.g., Ethernet, Wi-Fi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices onboard a vehicle. For example, vehicle network 106 can include a CAN bus, in which some in-vehicle sensors and/or components communicate via a CAN bus, and a wired or wireless local area network in which some device in vehicle communicate according to Ethernet, Wi-Fi®, and/or Bluetooth communication protocols.

Vehicle 102 typically includes a variety of sensors 108 in addition to torque sensor 122. Sensors 108 can include a suite of devices that can obtain one or more measurements of one or more physical phenomena. Some of sensors 108 can detect data that characterize the operational environment of the vehicle, such as vehicle speed (e.g., from vehicle wheel speed sensors), vehicle towing parameters, vehicle braking parameters, engine torque output, engine and transmission temperatures, battery temperatures, vehicle steering angles, etc. Some of sensors 108 can detect data that characterize the physical environment of vehicle 102, such as ambient air temperature, humidity, weather conditions (e.g., rain, snow, etc.), parameters related to the inclination or gradient of a road or other type of path on which the vehicle is proceeding, etc. In examples, sensors 108 can operate to detect the position or orientation of the vehicle utilizing, for example, signals from a satellite positioning system (e.g., the global positioning system or GPS); accelerometers, such as piezo-electric or microelectromechanical systems MEMS; gyroscopes such as rate, ring laser, or fiber-optic gyroscopes; inertial measurement units IMU; and magnetometers. In examples, sensors 108 can include sensors to detect aspects of the environment external to vehicle 102, such as radar sensors, scanning laser range finders, cameras, etc. Sensors 108 can also include light detection and ranging (LIDAR) sensors, which operate to detect distances to objects by emitting a laser pulse and measuring the time of flight for the pulse to travel to the object and back. Sensors 108 may include a controller and/or a microprocessor, which executes instructions to perform, for example, analog-to-digital conversion to convert sensed analog measurements and/or observations to input signals that can be provided to computer 104, e.g., via vehicle network 106.

Computer 104 can be configured for utilizing vehicle-to-vehicle (V2V) communications via communication component 114 and/or may interface with devices outside of the vehicle, e.g., through wide area network (WAN) 116 via V2V communications. Computer 104 can communicate outside of vehicle 102, such as via vehicle-to-infrastructure (V2I) communications, vehicle-to-everything (V2X) communications, or V2X including cellular communications C-V2X, and/or wireless communications cellular dedicated short-range communications DSRC, etc. Communications outside of vehicle 102 can be facilitated by direct radio frequency communications and/or via network server 118. Communications component 114 can include one or more mechanisms by which computer 104 communicates with vehicles outside of vehicle 102, including any desired combination of wireless, e.g., cellular, wireless, satellite, microwave, radio frequency communication mechanisms and any desired network topology or topologies when a plurality of communication mechanisms are used.

Vehicle 102 can include HMI 112, e.g., one or more of an infotainment display, a touchscreen display, a microphone, a speaker, a haptic device, etc. A user, such as the operator of vehicle 102, can provide input to devices such as computer 104 via HMI 112. HMI 112 can communicate with computer 104 via vehicle network 106, e.g., HMI 112 can send a message including the user input provided via a touchscreen, microphone, a camera that captures a gesture, etc., to computer 104, and/or can display output, e.g., via a display, speaker, etc. Further, operations of HMI 112 can be performed by a portable user device (not shown) such as a smart phone or the like in communication with computer 104, e.g., via Bluetooth or the like.

WAN 116 can include one or more mechanisms by which computer 104 may communicate with server 118. Server 118 can include an apparatus having one or more computing devices, e.g., having respective processors and memories and/or associated data stores, which may be accessible via WAN 116. In example embodiments, vehicle 102 could include a wireless transceiver (i.e., transmitter and/or receiver) to send and receive messages outside of vehicle 102. Accordingly, the network can include one or more of various wired or wireless communication mechanisms, including any desired combination of wired e.g., cable and fiber and/or wireless, e.g., cellular, wireless, satellite, microwave, and radio frequency communication mechanisms and any desired network topology or topologies when multiple communication mechanisms are utilized. Exemplary communication networks include wireless communication networks, e.g., using Bluetooth, Bluetooth Low Energy BLE, IEEE 802.11, V2V or V2X such as cellular V2X CV2X, DSRC, etc., local area networks and/or wide area networks 116, including the Internet.

FIG. 2 is a diagram showing steering components of an example steering system 126 for a vehicle 102. Steering system 126 includes steering wheel 124, upon which operator 205 of vehicle 102 can place a hand or hands, to control the heading of vehicle 102. Steering wheel 124 may be coupled to a steering column 215. In some examples, the torque sensor 122 is located in the steering column 215 proximate the steering wheel 124. Steering wheel 124 and steering column 215 are shown as being coupled to a shaft 225 via coupling 220, which may include, for example, a universal joint. The shaft 225 utilizes a coupling 230 to transmit torque applied by the operator's hand 205 to EPAS motor 240. EPAS motor 240 can operate to amplify and/or augment torque applied to steering wheel 124 to actuate steering rack 250, thus controlling the heading of vehicle 102. The EPAS motor 240 can be used to actuate movement of the steering wheel 124 and the torque sensor 122 can measure a torque, if any, applied to the steering wheel 124 in response to the actuated movement. When the operator is holding the steering wheel 124, the torque sensor 122 will measure a torque in a direction opposite the actuated movement.

In an example, the steering wheel 124 is moved back and forth (e.g., according to a sine-wave) a small amount so as to not affect the direction of the vehicle 102. In other words, the steering wheel can be rotated in a first rotational direction and subsequently rotated in a second rotational direction opposite, and typically equal, to the first. When at least one of the actuated movements is resisted by an operator's hand being in contact with the steering wheel 124, the resulting torque measurement is higher than a measurement resulting from e.g., steering column friction or a measurement resulting from an operator's hand lightly resting on the steering wheel. This higher torque measurement allows for establishing a higher predetermined threshold to which the torque measurement is compared, thereby typically providing a more reliable determination of whether an operator's hand is in contact with a vehicle steering wheel. In an example where more than one torque measurement is taken (e.g., measurements resulting from both back and forth movements) the resulting measurements can be e.g., averaged or the highest measurement can be used to compare with the predetermined threshold.

In another example, in response to determining that the vehicle is turning, the steering wheel is rotated in a direction opposite the direction the vehicle is turning (i.e., counter-steers). In other words, the vehicle is positioned off-center to the outside of the turn. In an alternative example, the vehicle is positioned off-center to the inside of the turn. In both examples, the vehicle is maintained within the lane. As used herein, turning refers to causing a vehicle to change direction by adjusting the angles of the front wheels by way of changing an angle of a steering rack 250, for example. When the operator applies a rotational force to the steering wheel to change the direction, i.e., heading or yaw, of the vehicle, the applied counter-steering torque does not interfere with the vehicle's lateral control. One way to do this is to specifically supply torque based upon road-curvature, which can be measured e.g., using front facing cameras to detect lane lines. That is rather than apply a sine-wave, the actuated rotation of the steering wheel can be specifically tailored to act as counter-steering resistance. This way it behaves as a lateral-control dampener instead of a noise, which enables increasing the torque supply. For example, when turning, a large variation in steering input may be expected by an operator. In this case, the system can introduce a larger change in input without the driver noticing as much.

In an alternative example, the steering column 215 also includes an actuator 210 operative to move (i.e., rotate) the steering wheel 124 separately from the steering rack 250. The actuator 210 may be part of a steer-by-wire system where the shaft 225 and couplings 220 and 230 are removed or selectively decoupled (e.g., with a clutch mechanism) from the steering system 126. In a steer-by-wire system the EPAS motor 240 can control the angle of the front wheels independently of the steering wheel 124 in certain circumstances. Thus, a steer-by-wire system can supply any necessary amount of torque via the actuator 210 for hands on/off detection to the steering wheel 124 without interfering with the lateral control of the vehicle. In this case, the actuator 210 can supply a greater amount of torque as either a sine-wave or as counter-steering. The torque can be continuously increased until the steering wheel 124 is visibly moving while at the same time instructing the operator to grasp the wheel, if necessary, e.g., via the HMI 112.

In situations where the computer 104 is assisting with steering, for example, the actuator 210 can move the steering wheel 124 to an obviously offset position (e.g., 45 degrees to the right) without affecting the direction of the vehicle. The operator can then be informed that they need to return the steering wheel 124 to a straight-ahead or centered position (0 degrees) and maintain the steering wheel in that position. The operator is then determined to have their hands on the steering wheel 124 because they are forcing the steering wheel to remain centered within a tolerance (e.g., −5 to 5 degrees). In this example, the system may additionally employ a steering wheel angle sensor to monitor the position of the steering wheel with respect to the upright position.

Operators may attempt to spoof hands on/off detection systems by adding a weight to the steering wheel 124, for example. To mitigate this, the direction and/or intensity of the torque applied in either sine-wave or counter-steering implementations can be varied and/or randomized at times when hands on/off detection is engaged. In an example, the torque applied to actuate the steering wheel 124 can be gradually increased. If an operator has their hands on the steering wheel 124 the measured torque on the steering wheel 124 would be expected to increase as the operator attempts to compensate for the increasing torque. In contrast, if a weight was added to the steering wheel 124 the measured torque would be expected to remain approximately constant, indicating a potential spoofing. In a further example, in the context of a steer-by-wire system, the computer 104 can randomly activate a first actuator (e.g., actuator 210) to rotate the steering wheel 124 independently of a second actuator (e.g., EPAS motor 240) that controls the angle of the front wheels. The measured torque on the steering wheel 124 in response to the random steering wheel movements can help identify spoofing. For example, similar torque measurements for multiple steering wheel movements having different magnitudes and directions can indicate spoofing such as a weight being added to the steering wheel 124. In an example, the steering wheel angle can be randomly chosen from approximately −90 degrees to +90 degrees.

The predetermined torque threshold can be determined empirically. For example, steering system friction torque can be measured from many sample vehicles and/or steering systems to select the highest expected friction torque. The threshold can then be set at some value above the highest expected friction torque. For example, based on empirical data, the highest expected friction torque can be multiplied by a factor of e.g., two or three to set the predetermined threshold.

Responsive to a measured torque being above the predetermined threshold, so as to indicate that the operator of vehicle 102 has one or more hands in contact with steering wheel 124, a vehicle assisted driving application can operate in a mode suitable for vehicle operation while the operator's hands are in contact with the steering wheel, e.g., lane-keeping assist and lane-centering assist. Responsive to the measured torque from one or more hands of the operator being below the predetermined threshold, to indicate removal or absence of the operator's hands from steering wheel 124, the vehicle assisted driving application can operate in a mode suitable for vehicle operation while the operator's hands are not in contact with the steering wheel. Such operation can include actuating a propulsion component of vehicle 102, providing a notification to the operator, actuating a vehicle brake, etc.

Figure 3:
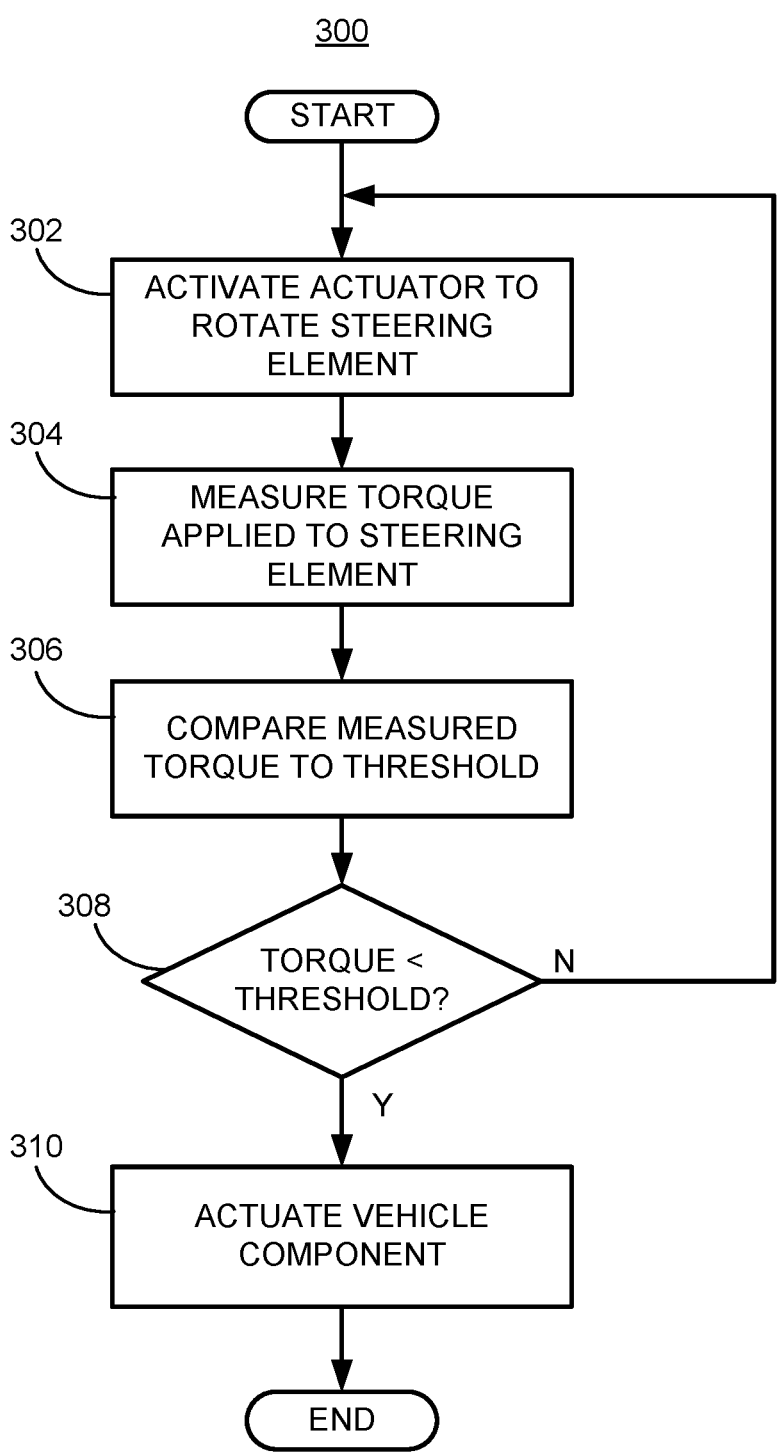
FIG. 3 is a process flow diagram illustrating an example process for hands on/off detection.

FIG. 3 is a process flow diagram illustrating an example process 300 for determining whether an operator's hands are in contact with a vehicle steering wheel. Process 300 can be implemented in a computer 104 included in a vehicle 102. Process 300 includes multiple blocks that can be executed in the illustrated order. Process 300 could alternatively or additionally include fewer blocks or include the blocks executed in different orders.

Process 300 can begin at block 302, such as in response to vehicle 102 being placed into an ON state, or in a "drive" state to operate on a roadway, for example. Block 302 can include the computer 104 activating an actuator, such as actuator 210 or EPAS motor 240, to actuate or rotate the steering wheel 124 in a manner that causes an operator to resist rotation of the steering wheel 124 while not adversely affecting the lateral control or direction of the vehicle.

In an example, the computer 104 can actuate movement of the steering wheel 124 in a first rotational direction and subsequently rotate the steering wheel 124 in a second rotational direction opposite the first. In another example, the computer 104 can determine that the vehicle 102 is turning and in response to a determination that the vehicle 102 is turning, rotate the steering wheel 124 in a direction opposite the direction the vehicle 102 is being turned. In a further example, in the context of a steer-by-wire system, the computer 104 can actuate movement of the steering wheel

124 including rotating the steering wheel 124 to a specified angular offset from a center position, such as 45 degrees.

Process 300 can continue at block 304, which can include computer 104 measuring a torque applied to the steering wheel 124 in a direction opposite the actuated movement with a torque sensor 122.

At block 306, the computer 104 can compare the measured torque from block 304 with a predetermined threshold.

In response to a determination at decision block 308 that operator 205 has applied at least a threshold level of torque to steering wheel 124, process 300 may return to block 302 where the system continues to monitor whether an operator's hands are in contact with the steering wheel 124. Otherwise, in response to a determination that the measured torque is less than the predetermined threshold and that operator 205 does not have at least one hand in contact with steering wheel 124, process 300 can proceed to block 310.

At block 310 computer 104 can actuate one or more components of vehicle 102, such as generating a message to operator 205, e.g., an audio message or a message via a display screen, etc. In an example, the audio and/or visual message can indicate to the operator to grasp the steering wheel. Alternatively, or in addition, computer 104 can initiate a haptic output to steering wheel 124 or initiate generation of an audible signal. Alternatively or additionally, computer 104 can actuate one or more components of vehicle 102, such as steering, reducing propulsion of, and/or braking the vehicle 102 according to one or more predefined maneuvers if an operator cannot be reengaged e.g., after a specified length of time.

After block 310, process 300 ends.

Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

What is claimed is:

1. A system, comprising:
   a computer that includes a processor and a memory, the memory including instructions executable by the processor to:
   upon actuating movement of a steering element of a vehicle, measure a torque applied to the steering element in a direction opposite the actuated movement;
   in response to a determination that the torque is less than a predetermined threshold, actuate a component of the vehicle; and
   determine that the vehicle is turning and in response to a determination that the vehicle is turning, rotate the steering element in a direction opposite a direction the vehicle is turning.

2. The system of claim 1, wherein the instructions to actuate movement of the steering element include instructions to rotate the steering element in a first rotational direction and subsequently rotate the steering element in a second rotational direction opposite the first.

3. The system of claim 1, wherein the predetermined threshold is determined empirically.

4. The system of claim 1, wherein the instructions to actuate movement of the steering element include instructions to rotate the steering element to a specified angular offset from a center position.

5. The system of claim 4, wherein the instructions to actuate a component of the vehicle include instructions to provide output to indicate returning the steering element to the center position.

6. The system of claim 1, further comprising a first actuator to actuate movement of the steering element and a second actuator to control a direction of the vehicle.

7. The system of claim 6, wherein the instructions to actuate movement of the steering element include instructions to randomly activate the first actuator to rotate the steering element independently of the second actuator.

8. The system of claim 1, wherein the instructions to actuate the component of the vehicle include instructions to actuate a vehicle brake.

9. The system of claim 1, wherein the instructions to actuate the component of the vehicle include instructions to provide audio and/or visual output indicating to an operator of the vehicle to grasp the steering element.

10. A method, comprising:

upon actuating movement of a steering element of a vehicle, measuring a torque applied to the steering element in a direction opposite the actuated movement;

in response to a determination that the torque is less than a predetermined threshold, actuating a component of the vehicle; and determining that the vehicle is turning and in response to determining that the vehicle is turning, rotating the steering element in a direction opposite a direction the vehicle is turning.

11. The method of claim 10, wherein actuating movement of the steering element includes rotating the steering element in a first rotational direction and subsequently rotating the steering element in a second rotational direction opposite the first.

12. The method of claim 10, wherein actuating movement of the steering element includes rotating the steering element to a specified angular offset from a center position.

13. The method of claim 12, wherein the specified angular offset is approximately 45 degrees.

14. The method of claim 12, wherein actuating a component of the vehicle includes providing audio and/or visual output to indicate returning the steering element to the center position.

15. The method of claim 10, further comprising activating a first actuator to actuate movement of the steering element and activating a second actuator to control a direction of the vehicle.

16. The method of claim 15, wherein actuating movement of the steering element includes randomly rotating the steering element.

17. The method of claim 10, wherein the predetermined threshold is determined empirically.

18. The method of claim 10, wherein actuating a component of the vehicle includes providing audio and/or visual output indicating to an operator of the vehicle to grasp the steering element.

* * * * *